United States Patent [19]
Downey et al.

[11] Patent Number: 5,107,592
[45] Date of Patent: Apr. 28, 1992

[54] TOOL-SUPPORTING ATTACHMENT FOR A VEHICLE

[76] Inventors: Larry Downey, 1680 Spring Road; Patrick Downey, 1440 Spring Road, both of, Lennoxville, Québec, Canada, J1M 2A2

[21] Appl. No.: 580,207

[22] Filed: Sep. 10, 1990

[51] Int. Cl.⁵ .............................................. A01G 3/08
[52] U.S. Cl. ..................................... 30/379.5; 56/233; 56/234; 83/928
[58] Field of Search ................. 30/379.5, 379; 173/22, 173/25; 144/34 R; 83/928; 56/234, 233

[56] References Cited

U.S. PATENT DOCUMENTS

| | | | |
|---|---|---|---|
| 2,474,981 | 7/1949 | McCardell | 173/22 X |
| 2,770,266 | 11/1956 | Way | 30/379 |
| 4,326,570 | 4/1982 | Fridley et al. | 144/34 R X |
| 4,336,732 | 6/1982 | Liet et al. | 30/379.5 X |
| 4,832,412 | 5/1989 | Bertrand | 30/379 X |
| 4,977,674 | 12/1990 | van der Merwe et al. | 30/379.5 |

FOREIGN PATENT DOCUMENTS

2343106 9/1977 France .................................. 173/25

*Primary Examiner*—Frank T. Yost
*Assistant Examiner*—Rinaldi Rada
*Attorney, Agent, or Firm*—McGlew & Tuttle

[57] ABSTRACT

A tool-supporting attachment to be mounted on a vehicle for use in suspending motorized tools which must be carried on long distances is disclosed. This attachment comprises levelling means to permit to its upper frame portion to always be in a substantially horizontal position with respect to the ground on which the vehicle is moved such that the tools are always kept at a constant height above the ground.

13 Claims, 8 Drawing Sheets

TOOL-SUPPORTING ATTACHMENT FOR A VEHICLE

BACKGROUND OF THE INVENTION a) Field of the Invention

This invention relates to a tool supporting attachment for a vehicle. More particularly, it relates to a vehicle attachment for use in suspending motorized tools which must be carried on long distances, such as a hedge trimmer or the like used to trim trees in a plantation or a field.

b) Brief Description of the Prior Art

Trimming of trees in a plantation has for many years involved the use of gas-powered hedge trimmers which had to be carried manually by an operator, who at the same time had to carry a gas motor on his back so that the trimmer would be transportable to the fields. The disadvantges of such an assembly involve heavy weight to be transported by the operator, as well as noxious effects of the gas fumes emitted from the motor, and the noise produced by such a motor. Moreover, since the carrying of this assembly is very tiring, the production rate of each operator is affected, and the duration of each production day, shortened.

OBJECTS OF THE INVENTION

One object of the present invention is to provide a vehicle attachment which allows the vehicle to support the weight of the tools that were before carried by operators.

Another object of the invention is to provide a supporting attachment of the above mentioned types, in which the supported tools are easily manipulatable.

A further object of the invention is to provide a supporting attachment where the tools are powered by the vehicle on which the attachment is fixed.

Still a further object of the invention is to provide a supporting attachment which may be kept horizontal irrespective of the inclination of the ground on which the vehicle transporting it moves along.

SUMMARY OF THE INVENTION

In accordance with the invention are achieved with a tool supporting attachment for a powered vehicle, the supporting attachment comprising:

(a) a tiltable frame to be mounted onto the vehicle, the frame comprising:

an upper frame portion extending above the vehicle in a substantially horizontal plane; and two upright frame portions having upper ends rigidly connected to the upper frame portion, the upright frame portions being pivotably mounted onto the vehicle through first and second universal joints, at least one of the upright frame portion being telescopically adjustable in height, the universal joints having one axis in common, hereinafter called "first axis";

(b) levelling means for use to horizontally position the upper frame portion with respect to the ground, the levelling means comprising:

means for adjustably rocking the tiltable frame about the first axis; and means for vertically adjusting the height of one of the upright frame portions, the adjusting means causing the tiltable frame to rock about another axis of the universal joint of the other upright frame portion, perpendicular to the first axis; and (c) at least one tool supporting means comprising: an arm having one end pivotably connected to the upper frame portion, the arm extending in the same substantially horizontal plane as the upper frame portion and being pivotable in the same plane;

a hook-holding carrier mounted onto the arm; and a tool-supporting hook pivotably mounted onto the carrier, the hook projecting downwardly from the carrier and being pivotable about an axis perpendicular to the plane.

In use, the tiltable frame mounted onto the vehicle can be adjusted by the levelling means so that the upper frame portion of the tiltable frame is perfectly horizontal whatever the inclination of the ground on which the vehicle is moved, and a tool hanged down from the hook of each tool supporting means can be manually brought to a desired location by manual orientation of the arm until the carrier is positioned above the desired location.

As may be understood, the supporting attachment according to the invention obviates the above-mentioned disadvantages by providing a tool supporting attachment which is carried by a vehicle, preferably a tractor. These tools are adapted to be powered by electric motors, each of which is now powered by the tractor in a well known manner such as by providing mechanical movement to an electric generator thereby providing electric power to be distributed among the electric motors. Such an assembly eliminates the need for the operator(s) to hold the heavy tool and is easily displaceable along with providing electrical power for safer operation.

DESCRIPTION OF THE PREFERRED EMBODIMENT OF THE INVENTION

Figure 1:
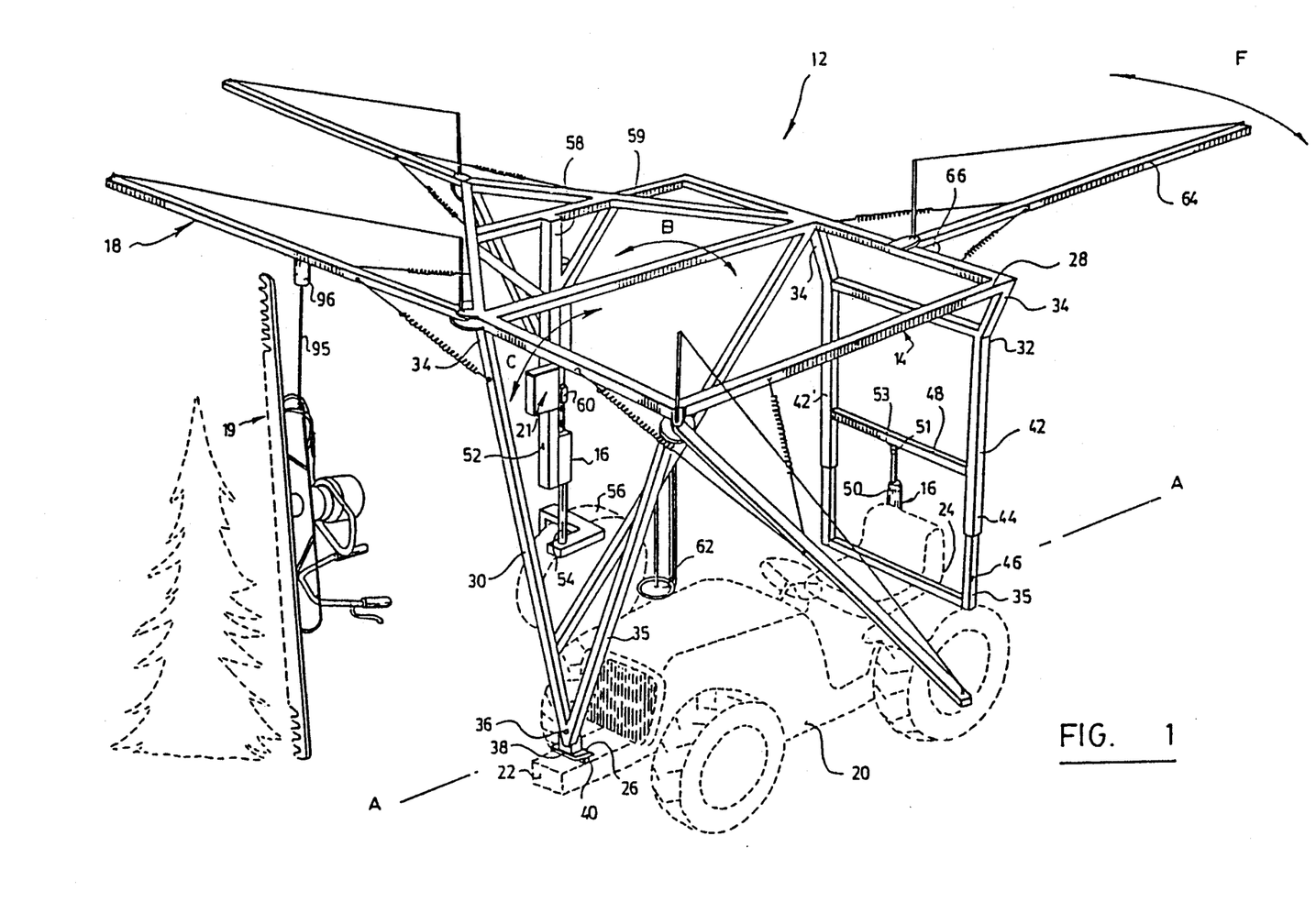
FIG. 1 is a perspective side view of a supporting attachment according to the invention, shown attached on a tractor.

The tool-supporting attachment 12 according to the invention as shown in the accompanying drawings basically comprises a tiltable frame 14, levelling means 16 to adjust the position of the tiltable frame in relation to the ground, and tool supporting means 18 as shown in FIG. 1.

The attachment further comprises at least one tool 19 which is supported by tool-suporting means 18, and power means 21 to provide electrical current for the tool(s) 19.

The tool-supporting attachment 12 is adapted to be mounted on a vehicle, preferably a small tractor 20, like the one sold under the trade-mark KUBOTA* B-1750 (four wheel-drive).

The tiltable frame 14 is attached to the front 22 and rear end 24 of the tractor through universal joints, one 26 at the front of the tractor and the other (identified as 27, shown in FIG. 3) at the rear of the tractor.

The frame 14 includes an upper frame portion 28 extending above the tractor 20, and two upright frame portions 30 and 32 having upper ends 34 rigidly connected to the upper frame portion 28 (preferably by welding although such connection could also be made with bolts and screws). The lower end of each upright frame portion 35 is pivotably connected to the tractor 20 through one of the universal joints 26 and 27, which both comprise horizontal pins 36 that are aligned and substantially parallel to the longitudinal axis (line A) of the tractor 20. These first pins 36 allow the tiltable frame 14 to rock from left to right about an axis parallel to this axis A, as shown by arrow B. Each pin 36 is mounted on a horizontal plate 38 which in turn is mounted on a second horizontal pin 40 substantially perpendicular to the first pin 36. These pins 40 allow the tiltable frame 14 to rock frontwardly and rearwardly, perpendicularly to the axis A, as shown by arrow C. Of course, it will appear obvious to a person skilled in the art that any other type of universal joints could be used to achieve the above mentioned tilting movements.

One of the upright frame portion 30 or 32 is telescopic. In the present embodiment, the rear upright frame portion 32 comprises two vertical frame member 42 and 42' each of which is constituted by a hollow upper sleeve 44 which slidably receives a lower member 46 adapted to be engageable into the sleeve 44. The two vertical frame members 42 and 42' are connected to each other, preferably by welding, through a horizontal member 48, to which the upper end of a hydraulic actuator 50 is pivotably attached in a well known manner (such as with a pair of ears 51 and a transverse bolt 53). The lower end of the actuator is connected to the universal joint 27 by way of two ears and a pin (or a bolt) as shown in FIG. 3 also by reference numerals 51 and 53.

Figure 2:
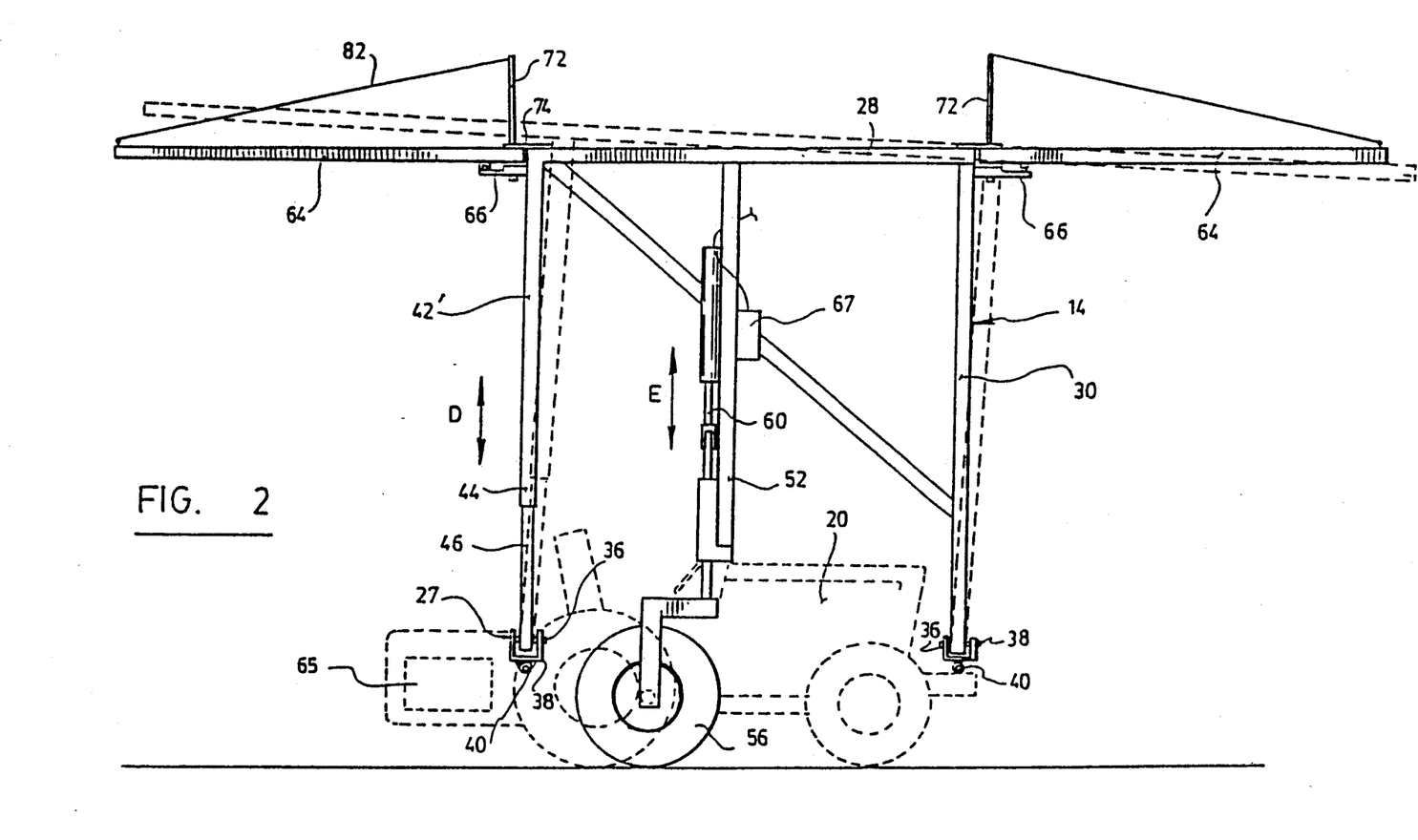
FIG. 2 is a side elevational view of the attachment shown in FIG. 1.

The hydraulic actuator 50 is part of said levelling means in as much as it is used for adjusting the height of the telescopic upright frame portion 32 which in turn adjust the inclination of the upper frame 28 as is best shown in FIG. 2.

Figure 3:
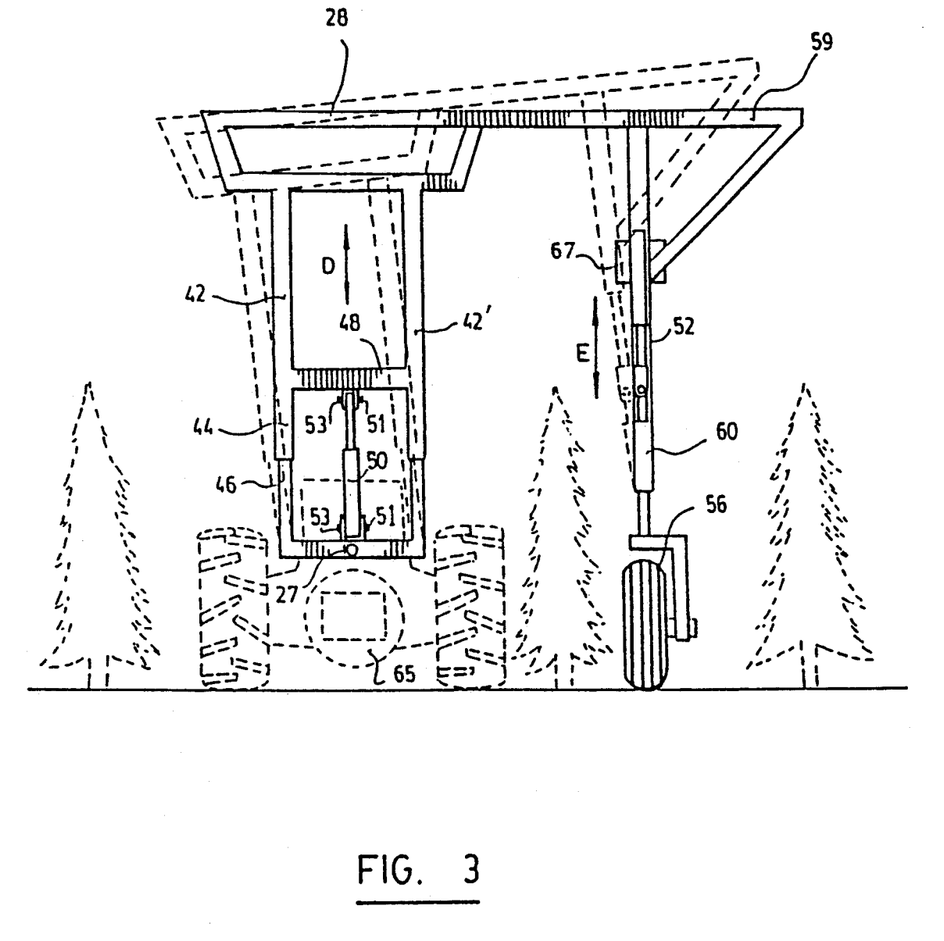
FIG. 3 is a rear elevational view of the same attachment.

As shown in FIG. 3, extension of the hydraulic actuator 50 (arrow D) causes to push the horizontal member 48 upwardly. This brings the two upper sleeves 44 along, and causes the inclination of the tiltable frame 14 towards the front of the tractor 22, and vice versa.

Figure 4:
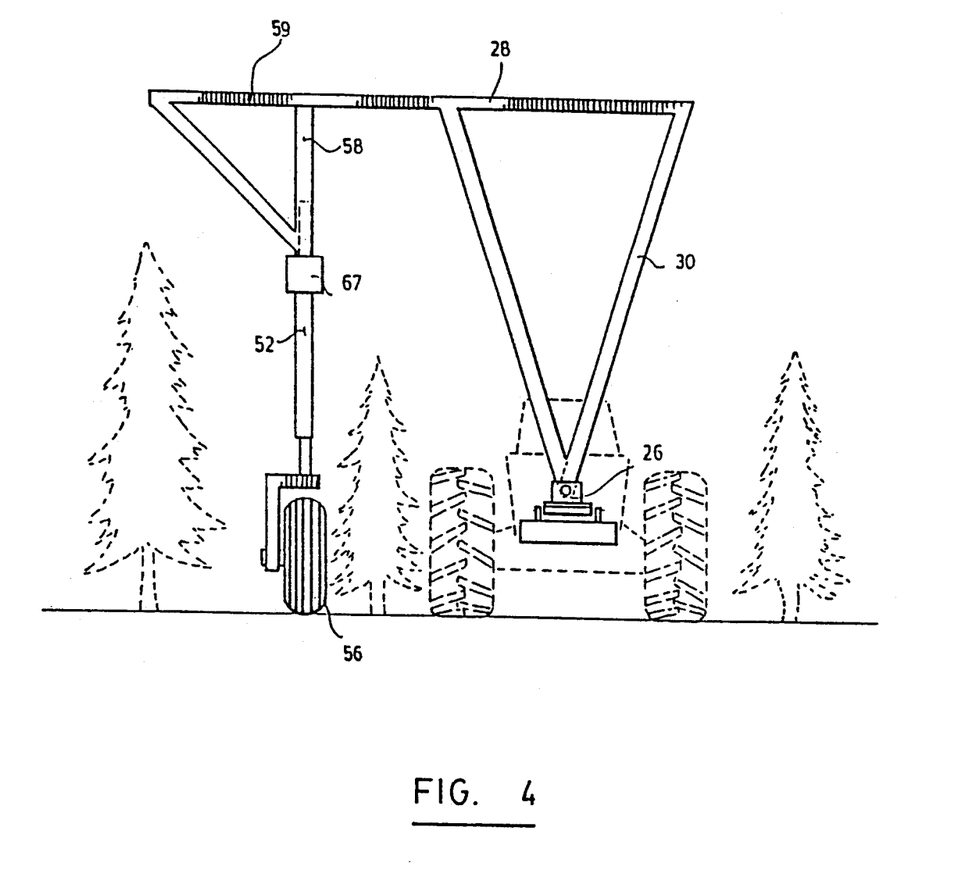
FIG. 4 is a front elevational view of the same attachment.

Means are provided for adjustably rocking the tiltable frame about axis A. Returning now to FIG. 1, the means comprise a vertical telescopic stud 52 having a lower end 54 on which a fifth wheel 56 is pivotably mounted, and an upper end 58 rigidly connected (preferably by welding) to the upper frame 28 through an extension 59 thereof. This vertical stud 52 is adjustable in height by means of a hydraulic actuator 60 which is connected by its lower end to the fifth wheel 56. As shown in FIGS. 2, 3 and 4, extension and shortening of the actuator 60 along arrow E causes the tiltable frame to rock from left to right of the tractor 20. It will now appear obvious to a person skilled in the art that operation of both hydraulic actuators at the same time permits to position at will the tiltable frame relative to the ground. If the tractor is travelling on an uneven ground, the frame can always be kept horizontal by simultaneously acting on both levelling means. This can be achieved in practise by a joystick-type manual control functionally connected to both actuators 50 and 60, positioned preferably next to the driver of the tractor. Levelling of the frame can be made easier by providing on the frame an inclinometer 62 fixed to the upper frame portion in such a manner that the driver may easily see it.

The tool-supporting attachment shown in FIG. 1 further comprises at least one tool-supporting means 18 which include an arm, more particularly embodied as a rail 64 in the present embodiment. This rail is 64 connected to the upper frame portion 28 through a pivot 66. This rail 64 extends in substantially the same plane as the upper frame 28 and is pivotable as shown with the arrow F. This tool-supporting means 18 includes a tool-supporting hook 94 suspended on the rail 64 through a rotatable connection 96. Such a connection permits passage of an electrical current provided by the power means 21 such as an electric generator 65 connected in a well known manner to the power transmission orifice (PTO) of the tractor 20. The power means further includes a power distribution means 67 connecting the generator 65 to the tools 19 to adjust the frequency of the current produced by the generator 65 according to the requirements of the tools 19 by means well known in the art such as diodes, etc.

FIGS. 2, 3, and 4 show details of the embodiment of the invention previously described. As best shown in FIG. 4, the front upright portion 30 has a V-shape, with the apex-shaped lower end of this portion being connected to the universal joint 26. However, the front upright portion 30 could also be shaped like the rear upright portion 42 shown in FIG. 3, and another hydraulic actuator 50 could be connected to such a modified front upright portion such that raising and lowering of the upper frame be performed from either the front end 22 or the rear end 24 of the tractor 20.

Figure 5:
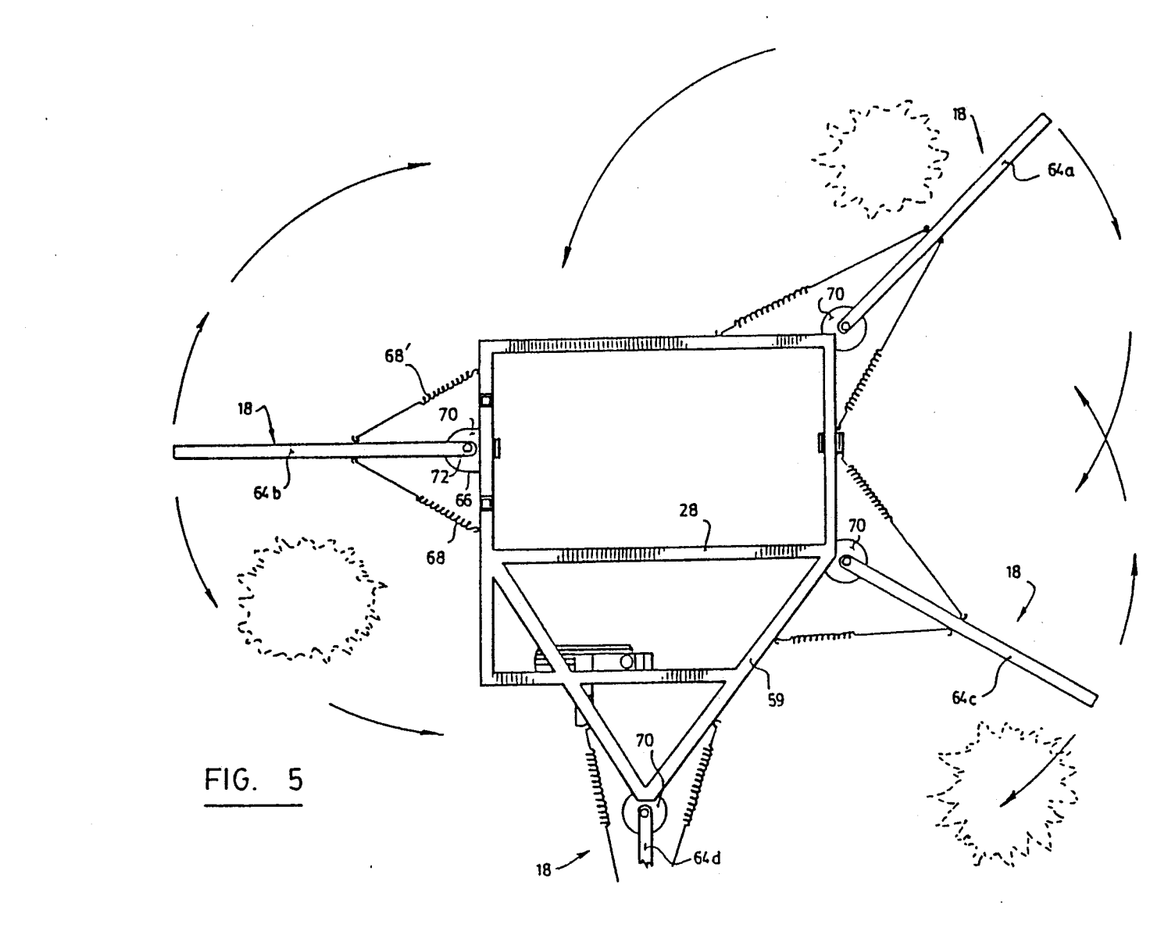
FIG. 5 is a top plan view of the same attachment.

FIG. 5 shows four tool supporting means 18 connected to the upper frame 28 by four individual pivots 66. Each rail is resiliently held in position by a pair of springs 68 and 68' disposed on each of its sides, one end of each spring being connected to the frame 28, the other end being connected to the rail at a point distant from the pivot 66 such that it is diagonally oriented.

The disposition of the rails may vary according to their number and the particular needs of the user. For example, in this particular embodiment, there is provided four rails, a first one 64a disposed substantially frontwardly of the tractor, on the left side of the frame, to extend over one row of trees to be trimmed. The rail 64b which is to be disposed over the neighbouring row is preferably disposed rearwardly of the tractor such that both tool operators will not stand next to each other while working, thus avoiding accidents. A third rail 64c is disposed substantially frontwardly of the tractor on the right side of the frame, and is positioned over a third row of trees. A fourth rail 64d is disposed sidewardly of the tractor (either on the right of left side) extending from the side extension 58 of the frame over a fourth row of trees. In practise, each of these rails should be distanced from the adjacent one(s) by a distance similar to the one separating each row of trees (they usually are equidistant).

The weight of the suspended tool on the fourth rail is balanced by the fifth wheel 56, thus ensuring stability of the attachment.

Each rail 64 is fixed to the upper frame 28 through a pivotable connection 66 consisting essentially of, as shown in FIG. 2, a substantially circular, horizontal, plate 70 welded or bolted to the upper frame 28 at each point where a rail should be positioned.

Figure 6:
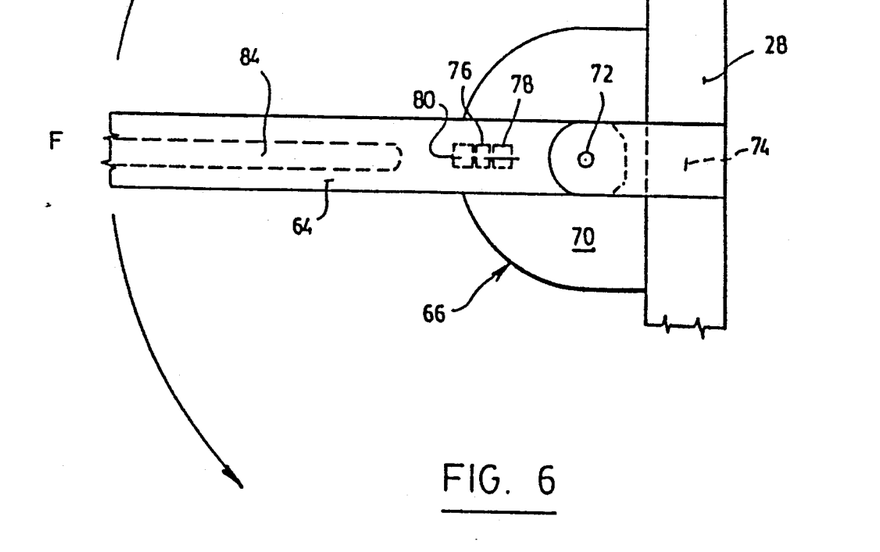
FIG. 6 is a detailed top plan view showing the pivotable connection between a rail and the upper frame of the attachment shown in the previous figures.
Figure 7:
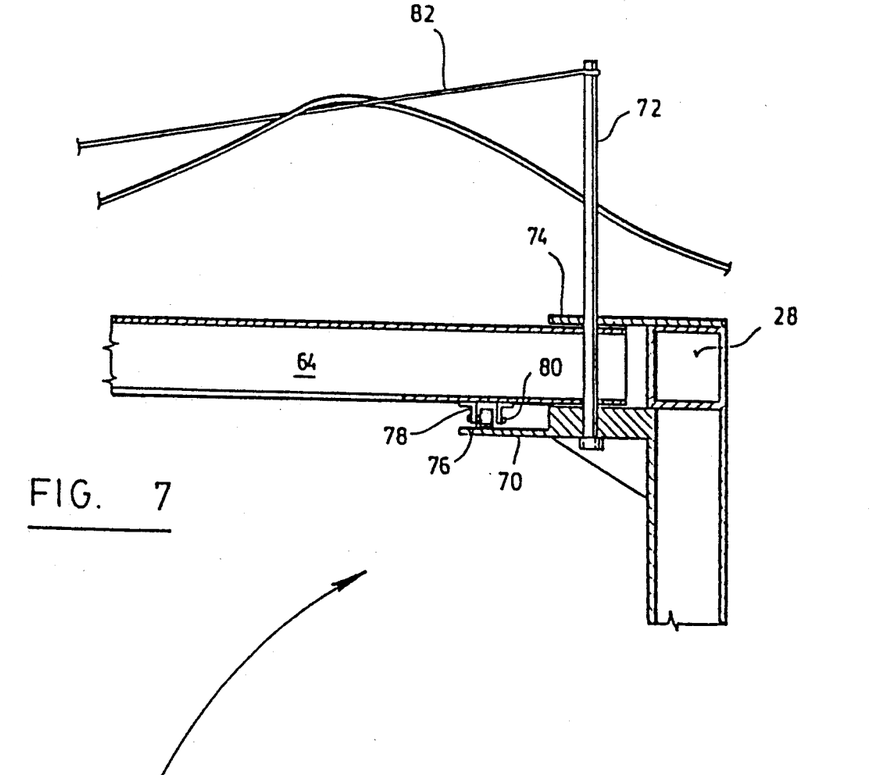
FIG. 7 is a detailed cross-sectional side view of the pivotable connection between a rail and the upper frame of the attachment according to the invention.

FIG. 6 shows in more detail the pivot 66 mounted on a horizontal plate 70 welded to the upper frame 28. The end of the rail 64 is disposed over the plate 70 such that its downward face rests on the upper face of the plate 70. The rail 64 is fixed to the plate by a vertical pin 72. As illustrated in FIG. 7, the pin 72 extends traversely accross the plate 70 and the rail 64 and through a second horizontal plate 74 which is also welded to the upper frame 28. The lower plate 70 preferably consists of two sections, one slightly raised section closer to the upper frame 28, and another lower section on which a bearing 76 can roll along the substantially circular path of the plate 70. The bearing 76 is fixed underneath the end of the rail 64 through two ears 78 and a transverse pin 80, in a classical fashion.

This pivotable connection will allow pivoting of the rail 64 about arrow F. Moreover, the pin 72 may extend upwardly of the upper plate 74 and retain thereby a cable 82 which is fixed at its other end to a distant point of the rail to act as further retaining means for the rail 64.

Returning now to FIG. 6, there is shown that the underside of the rail 64 is provided with a slot 84 which extends longitudinally but stops at a short distance from each end of the rail 64.

Figure 8:
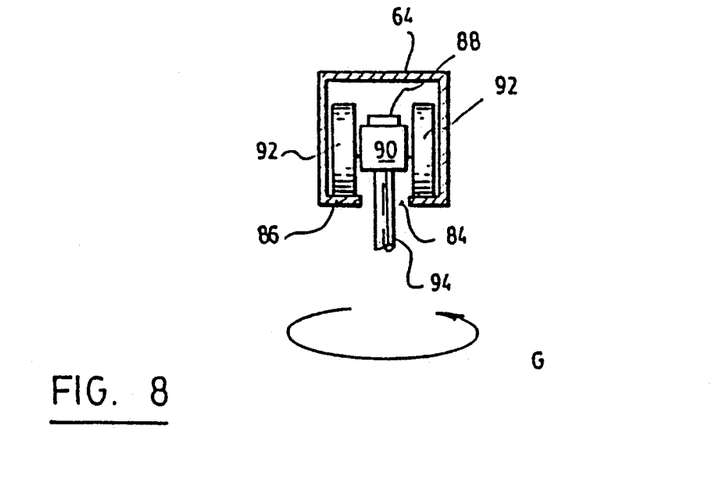
FIG. 8 is a front cross-sectional view of a tool-carrier engaged into its supporting rail.

FIG. 8 shows the rail 64 in cross-section when seen from one end thereof. As can be seen, the rail preferably has a hollow square-shaped cross-section. The underside of the rail 64 is provided with a central slot 84 having a width smaller than the width of the underside to provide margin portions 86 on each side. Rails of this type are produced by the company STANLEY*, for sliding doors.

Mounted inside the rail 64 and resting on the margin portions 86 is a hook-holding carrier 88 comprising a casing 90 on which are rotatably mounted transversely of the slot at least two wheels 92 (in this particular embodiment, two pairs of wheels 92). These carriers are most commonly known as chariots and also available from STANLEY* for sliding door assembly. Rotatably mounted on the casing 90 is a vertical, tool-supporting hook 94 extending downwarly from the carrier 88. The hook 94 is rotatable about its vertical axis (around line G which is perpendicular to arrow F). The tool-supporting hook 94 is provided with a rotatable electrical connection 96 to allow electrical connection from the power distribution means 67 to the motor 116 of the tool 19 which is suspended from the hook 95.

Figure 9:
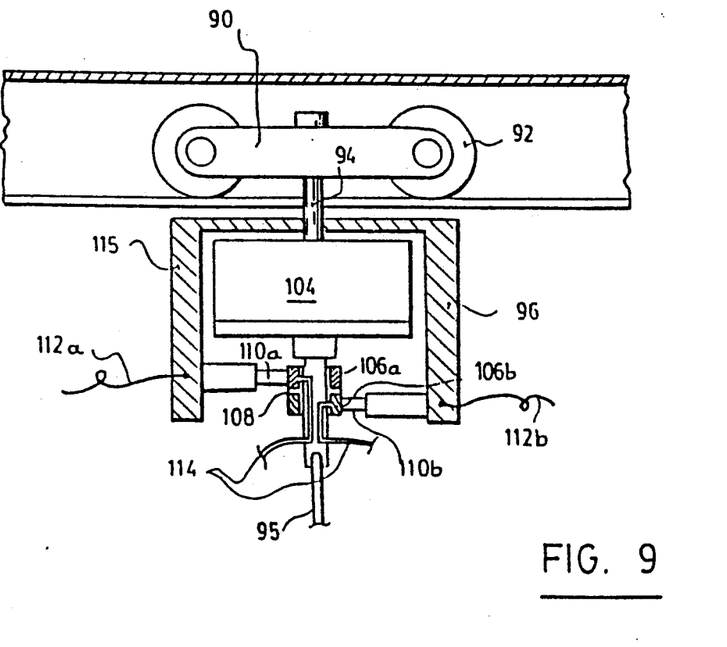
FIG. 9 is a detailed cross-sectional side view of the rail and carrier showing the rotatable electrical connection of the tool-supporting hook according to the invention.

As best shown in FIG. 9, the rotatable electrical connection 96 comprises a thrust bearing 104 supporting a pair of electrical-conducting rings 106a and 106b. Each ring is isolated from the other, and from the rest of the metal hook by insulating rings 108. The current is provided by an input wire 112a and 112b connected to the distribution means 67 and transmitted through a pair of brushes 110a and 110b being in contact with only one ring 106a or 106b. Each ring is in turn connected to output wires 114 descending along the hook 95 to eventually connect with the motor of the tool. The whole electrical connection 96 is protected in a casing 115.

Figure 10:
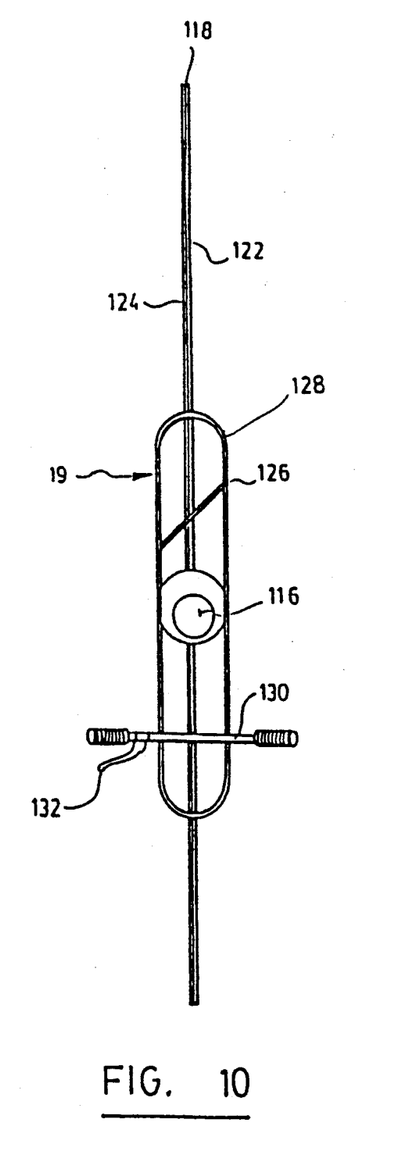
FIG. 10 is a front elevational view of a tool for use in the supporting attachment according to the invention.
Figure 11:
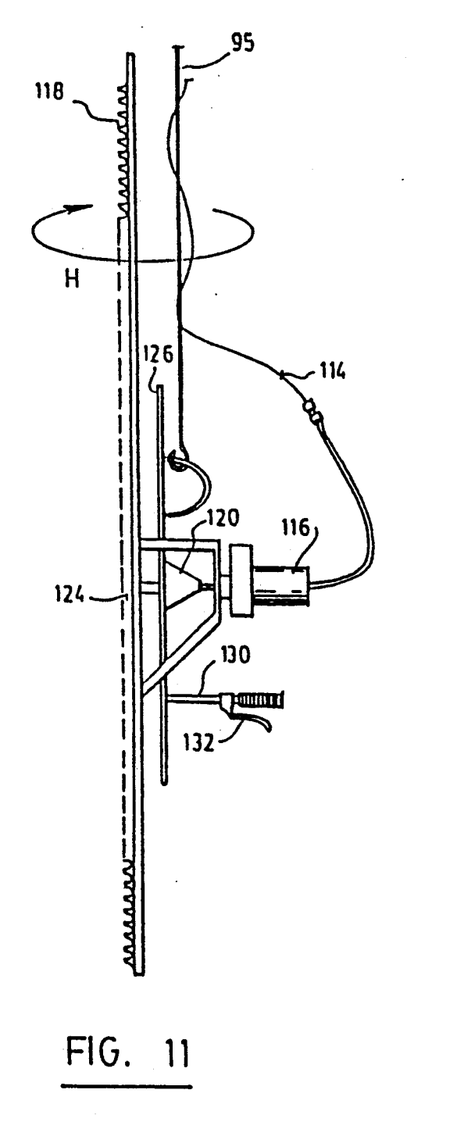
FIG. 11 is a side elevational view of the tool shown in FIG. 10.

Illustrated in FIG. 10 and 11 is one kind of tools 19 which may be suspended to the attachment 12. The tool 19 shown in this figure consists of a modified type of hedge-trimmer. Basically, it comprises a rotative electric motor 116 on which is mounted a double-blade saw 118 of the SAJE* type through an adaptor 120 (it will appear obvious to any person skilled in this art how to fabricate an adaptor to transform a rotative motion into a oscillating motion). The saw 118 consist of two blades 122 and 124, one of which 122 is fixed and does not oscillate, the other 124 being oscillating back and forth along a longitudinal axis in a regular movement. The fixed blade 122 is rigidly connected (preferably welded or bolted) to a frame portion 126 consisting essentially of a metal oval ring 128 to which is affixed at least one handle bar 130. On this handle bar is disposed an actuating manual switch 132 connected to the rotative motor 116, this switch 132 actuating the motor 116 which in turn activates the blade 124.

As can be seen in FIG. 11, the tool 19 may be suspended the metal hook 95 of the tool-supporting hook 94 of the tool-supporting means 18. The tool is rotatable about the vertical axis H.

In operation, a driver drives the tractor carrying the supporting attachment to a plantation where trees have to be trimmed. Each tractor should be small enough to pass in an alley between a row of trees without stamping on them. Most of the time, the rows are five to six feet apart, thus, the distance between the center of gravity of the tractor and the fifth wheel will accordingly be, such that one row of trees can pass through it. Of course, the height of the frame should be adjusted t fit the height of the trees to be trimmed and the fifth wheel positioned to travel on the next alley (as is illustrated in FIGS. 4 and 5). As the tractor progresses slowly along the alley (about 1 to 3 miles per hour), operators manipulate the tools suspended to the attachment while walking next to the tractor. As soon as an operator reaches a tree, he actuates the trimmer by means of the switch and moves around the tree at least once to trim the branches. He then deactivates the saw by releasing the switch and progresses to the next tree of the row, to proceed similarly. When the tractor progresses on an uneven ground, the driver actuates the hydraulic actuators such that the upper frame portion remains horizontal with respect to the ground such that the height of the tool above the ground is constant.

We claim:

1. A tool supporting attachment for a powered vehicle, said supporting attachment comprising:
(a) a tiltable frame to be mounted onto said vehicle, said frame comprising:
an upper frame portion extending above said vehicle in a substantially horizontal plane; and
two upright frame portions having upper ends rigidly connected to said upper frame portion, said upright frame portions being pivotably mounted onto said vehicle through first and second universal joints, at least one of said upright frame portions being telescopically adjustable in height, said universal joints having a first axis in common;

(b) levelling means for adjustably rocking the tiltable frame about said first axis;
means for vertically adjusting the height of at least one of said upright frame portions, said adjusting means causing said tiltable frame to rock about an other axis of the universal joint of the other of said upright frame portions, said other axis being perpendicular to said first axis;
(c) at least one tool supporting means comprising:
an arm having one end pivotably connected at a pivotable end to said upper frame portion, said arm extending in and being pivotable in said substantially horizontal plane;
as tool-holding carrier mounted onto said arm at a point distant from said pivotable end;
a tool-supporting means pivotably mounted onto said carrier, said hook projecting downwardly from said carrier and being pivotable about an axis perpendicular to the said substantially horizontal plane;
the tiltable frame mounted onto the vehicle being adjustable by said levelling means so that said upper frame portion of said tiltable frame is maintained in a substantially horizontal position regardless of the inclination of the ground on which the vehicle is moved, and a tool connected to said tool supporting means can be manually brought to a desired location by manual orientation of said arm until said carrier is positioned above said desired location.

2. A tool supporting attachment according to claim 1, wherein said arm of the tool-supporting means is a rail, and said tool-holding carrier is slidably mounted onto said rail,
whereby, said tool-supporting means can be manually brought to a desired location by manual sliding of the tool-holding carrier along the rail until said carrier is positioned above said desired location.

3. A tool supporting attachment according to claim 2, further comprising:
an electric motor,
a hedge-trimmer powered by said motor, said hedge-trimmer having one non-oscillating blade, and having a longitudinal axis and another blade actuated by said motor, said other blade moving along said axis in an oscillating manner against the non-oscillating blade, and
a frame portion rigidly connected to said non-oscillating blade, said frame portion comprising a handle bar,
wherein said frame portion can be removably suspended onto said tool-supporting means,
whereby said hedge-trimmer can be oriented by manipulation of said tool-holding carrier along said rail and manual orientation of said rail, and manual manipulation of said holding bar can cause said hedge-trimmer to be rotated at least once about a vertical axis.

4. A tool supporting attachment according to claim 3 further comprising:
an electric generator to provide a current for driving the motors of said tools,
a power distribution means for distributing and controlling the frequency of said current incoming from said generator and outgoing to the motor of said tools,
a rotatable electrical connection mounted on said tool-holding carrier to allow electrical connection from said power distribution means to said tool in a rotatable fashion,
whereby said electric generator is driven by the power of said vehicle, said current produced by said electric generator being fed to the power distribution means which in turn adjusts the frequency of said current according to the requirements of the motor of said took, splits the current int the number of tools connected, the current being further transmitted to each rotatable electrical connection to said tool-holding carrier.

5. A tool supporting attachment according to claim 1, further comprising:
a side extension extending from said upper frame in said substantially horizontal plane;
said levelling means includes a vertical telescopic stud having a lower end and an upper end rigidly connected to said upper frame portion through said side extension thereof, said telescopic stud including means to adjust the height of said tiltable frame, and a fifth wheel pivotably mounted onto the lower end of said telescopic stud,
said telescopic stud and the fifth wheel being positioned sideways to said tractor and being moveable along therewith, and
said telescopic stud can be adjusted in height to rock the upper frame portion about said first axis so that said upper frame portion of said tiltable frame is maintained in said horizontal position.

6. A tool supporting attachment according to claim 5, wherein said first tool supporting means is resiliently oriented substantially frontwardly of said upper frame, including a second tool supporting means being resiliently oriented substantially rearwardly of the upper frame, a third tool supporting means being resiliently oriented substantially frontwardly of the upper frame, and a fourth tool supporting means being resiliently oriented substantially sidewardly of the upper frame,
each tool supporting means comprising an arm having an inner end and an outer end, said outer end being pivotable about an approximately 180 degree angle and a tool-holding carrier being able to travel along said arm, said carrier adapted to hook said tool onto it a plurality of tools being supported by said supporting means being oriented at a plurality of positions about a substantially a 180 degree angle, and being positionable along said arm from said inner end to said outer end.

7. A tool supporting attachment according to claim 6, wherein each of said tool supporting means further comprises a pair of springs connected at a first end to said upper frame and at a second end to a point on said rail distant from said pivotable connection with the upper frame, said springs allowing each of said rail to resiliently retain an original orientation.

8. A tool supporting attachment according to claim 5, wherein said means for adjusting the height of said tiltable frame comprise a hydraulic actuator that cooperates with said telescopic stud, said actuator being functionally connected to manual controls.

9. A tool supporting attachment according to claim 1, further comprising:
an electric rotative motor,
a hedge-trimmer powered by said motor, said hedge-trimmer having one non-oscillating blade, and having a longitudinal axis, and another blade actuated by said motor, said other blade moving along said longitudinal axis in an oscillating manner against the non-oscillating blade, and a frame portion rigidly connected to said non-oscillating blade, said frame portion, having a handle bar, wherein said frame portion can be removably suspended onto said tool-supporting means, whereby said tool can be oriented by manual orientation of said arm and manual manipulation of said handle bar causing said tool to be rotated about a vertical axis.

10. A tool supporting attachment according to claim 1, wherein the means for vertically adjusting the height of said at least one upright frame portion is a hydraulic actuator, said actuator being functionally connected to manual controls.

11. A tool supporting attachment according to claim 1, wherein said levelling means further comprises an inclinometer mounted onto said tiltable frame to indicated the level position of said upper frame relative to the ground.

12. A tool supporting attachment according to claim 1, wherein one of said two upright frame portions tiltable frame is solid and pivotably mounted onto said vehicle through one of said universal joints, the other of said upright frame portions being telescopically adjustable in height and pivotably mounted onto said vehicle through the other universal joint;

whereby said one upright frame portion can be tilted about a second axis perpendicular to said first axis by adjusting the height of the other upright frame portion.

13. A tool supporting attachment for a powered vehicle comprising: an upper frame being tiltably supportable on the vehicle by upright frame portions, a rail being pivotably connected to said frame, a carrier on said rail being movable away from and toward said frame, and a hooking means disposed to receive and suspend a tool connected to said carrier, a plurality of additional rails being pivotably connected to said frame, a plurality of additional carriers on said plurality of additional rails, and a plurality of hooking means disposed to receive and suspend a plurality of tools connected to said plurality of additional carriers.

* * * * *